(12) United States Patent
Kwon

(10) Patent No.: US 12,103,484 B2
(45) Date of Patent: Oct. 1, 2024

(54) AIRBAG RETAINER AND AIRBAG RETAINER ASSEMBLY INCLUDING SAME

(71) Applicant: HYUNDAI MOBIS CO., LTD., Seoul (KR)

(72) Inventor: Oh Koang Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/465,566

(22) Filed: Sep. 12, 2023

(65) Prior Publication Data

US 2024/0227717 A1    Jul. 11, 2024

(30) Foreign Application Priority Data

Jan. 9, 2023    (KR) .......................... 10-2023-0002621

(51) Int. Cl.
*B60R 21/217*    (2011.01)

(52) U.S. Cl.
CPC .................................. *B60R 21/217* (2013.01)

(58) Field of Classification Search
CPC ..... B60R 21/217; B60R 21/26; B60R 21/261; B60R 2021/2725
See application file for complete search history.

(56) References Cited

U.S. PATENT DOCUMENTS

| | | | | |
|---|---|---|---|---|
| 6,007,098 A * | 12/1999 | Olson | ................. | B60R 21/2644 |
| | | | | 280/236 |
| 6,364,342 B1 * | 4/2002 | Kim | ..................... | B60R 21/217 |
| | | | | 280/736 |
| 6,962,362 B2 * | 11/2005 | Grossmann | ........... | B60R 21/217 |
| | | | | 280/731 |
| 7,374,199 B2 * | 5/2008 | Boyd | .................... | B60R 21/217 |
| | | | | 280/728.2 |
| 10,272,871 B2 * | 4/2019 | Kienzner | .............. | B60R 21/272 |
| 11,066,039 B2 * | 7/2021 | Issler | .................... | B60R 21/261 |
| 2013/0241181 A1 * | 9/2013 | Faeth | ................... | B60R 21/203 |
| | | | | 280/728.2 |

FOREIGN PATENT DOCUMENTS

| | | | | |
|---|---|---|---|---|
| DE | 202014008432 U1 * | 3/2016 | ......... | B60R 21/2037 |
| JP | 100214175 B1 * | 8/1999 | ........... | B60R 21/264 |

\* cited by examiner

*Primary Examiner* — Faye M Fleming
(74) *Attorney, Agent, or Firm* — NSIP Law

(57) ABSTRACT

An airbag retainer to stably support a filter while minimizing a welding spot, and an airbag retainer assembly are provided, where the airbag retainer assembly includes an airbag retainer coupled to a filter, the airbag retainer including an accommodation hole to accommodate an inflator is formed in a base, and a cage extending from an edge of the accommodation hole, the cage being configured to cover the accommodation hole, one or more discharge hole formed in the cage to transmit gas discharged from the inflator, and a support formed in the cage along a circumference of the discharge hole to support the filter, wherein the filter is configured to block residue generated by gas discharged from the inflator.

8 Claims, 4 Drawing Sheets

AIRBAG RETAINER AND AIRBAG RETAINER ASSEMBLY INCLUDING SAME

CROSS-REFERENCE TO RELATED APPLICATION

This application claims priority under 35 U.S.C. § 119 to Korean Patent Application No. 10-2023-0002621, filed on Jan. 9, 2023, in the Korean Intellectual Property Office, the entire disclosure of which is incorporated herein by reference for all purposes.

BACKGROUND

1. Field

The present invention relates to an airbag retainer and an airbag retainer assembly including the same.

2. Discussion of Related Art

An airbag retainer assembly is disposed at a side of an inlet hole of an airbag cushion and serves to fix an inflator for arranging an inflator in the airbag cushion. The airbag retainer assembly may be coupled to a housing which accommodates the airbag cushion using a coupling member such as a bolt.

The conventional airbag retainer assembly may include an upper retainer fixedly coupled to a filter and a lower retainer coupled to the upper retainer to support the upper retainer and coupled to the housing using a coupling member. In particular, the upper retainer is designed to have a thin hollow cross section so that a portion not including an edge portion of the filter is exposed to the outside of the upper retainer. Accordingly, the filter may be fixed to the upper retainer through a welding operation.

However, in the filter of the conventional airbag retainer assembly, since an area exposed to the outside of the upper retainer without being fixed to the upper retainer is greater than an area fixed to the upper retainer, there is a problem that more welding operations than necessary are required in an area, in which the upper retainer is in contact with the filter, to prevent separation of the filter.

In addition, in the filter of the conventional airbag retainer assembly, since the area exposed to the outside of the upper retainer without being fixed to the upper retainer is greater than the area fixed to the upper retainer, there is a problem that the filter is separated to the outside of the upper retainer due to a gas pressure discharged from the inflator. Accordingly, particles generated by the inflator may enter the interior of the airbag cushion and form melting holes in the airbag cushion. Accordingly, there is a problem of degrading the performance of the airbag cushion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an airbag retainer coupled to a filter, the airbag retainer including an accommodation hole to accommodate an inflator is formed in a base, and a cage extending from an edge of the accommodation hole, the cage being configured to cover the accommodation hole, one or more discharge hole formed in the cage to transmit gas discharged from the inflator, and a support formed in the cage along a circumference of the discharge hole to support the filter, wherein the filter is configured to block residue generated by gas discharged from the inflator.

The one or more discharge hole may include a first discharge hole and a second discharge hole disposed to surround the first discharge hole, and the filter may be partially exposed through the first discharge hole and the second discharge hole.

The support may be disposed between the first discharge hole and the second discharge hole.

The second discharge hole may include a plurality of second discharge openings spaced apart from each other along a circumference of the accommodation hole, and a plurality of second supports formed in the cage and each of the plurality of second supports may be disposed between two of the plurality of second discharge holes, respectively.

In another general aspect, there is provided an airbag retainer assembly including an airbag retainer configured to accommodates an inflator, and a filter coupled to the airbag retainer, wherein the airbag retainer includes accommodation hole to accommodate the inflator is formed in a base, a cage extending from an edge of the accommodation hole, and the cage being configured to cover the accommodation hole, a first discharge hole and a plurality of second discharge holes being formed in the cage to transmit gas discharged from the inflator, and a support formed in the cage between the first discharge hole and the second discharge hole to support the filter.

The filter may be partially exposed through the first discharge hole and the second discharge hole.

The support may be disposed between the first discharge hole and the second discharge hole and has a ring shape.

The second discharge hole may include a plurality of second discharge openings spaced apart from each other along a circumference of the accommodation hole, and a plurality of second supports may be formed in the cage and each of the plurality of second supports may be disposed between two of the plurality of second discharge holes, respectively.

Other features and aspects will be apparent from the following detailed description, the drawings, and the claims.

Figure 1:
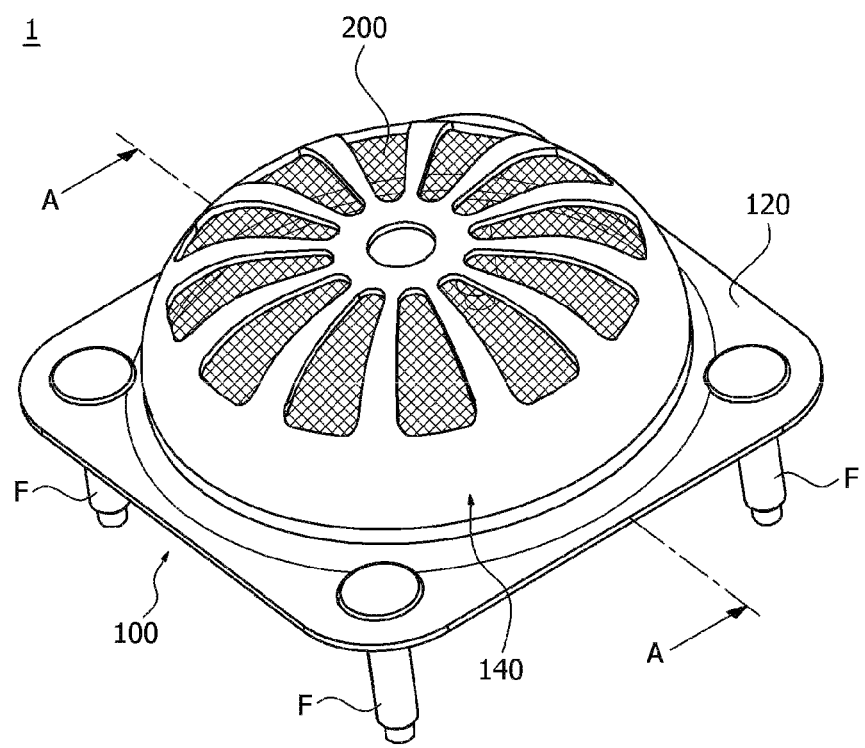
FIG. 1 is a perspective view illustrating an airbag retainer assembly according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or combination of a plurality of associated listed items.

When a first element is referred to as being "connected" or "coupled" to a second element, it will be understood that the first element may be directly connected or coupled to the second element, or a third element may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under the other element, such a description may include a case in which the one element is formed at an upper side or a lower side with respect to the other element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including" used herein specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when an airbag retainer and an airbag retainer assembly including the same are described in detail with reference to the accompanying drawings, components that are the same or correspond to each other will be denoted by the same or corresponding reference numerals in all drawings, and redundant descriptions will be omitted.

Figure 2:
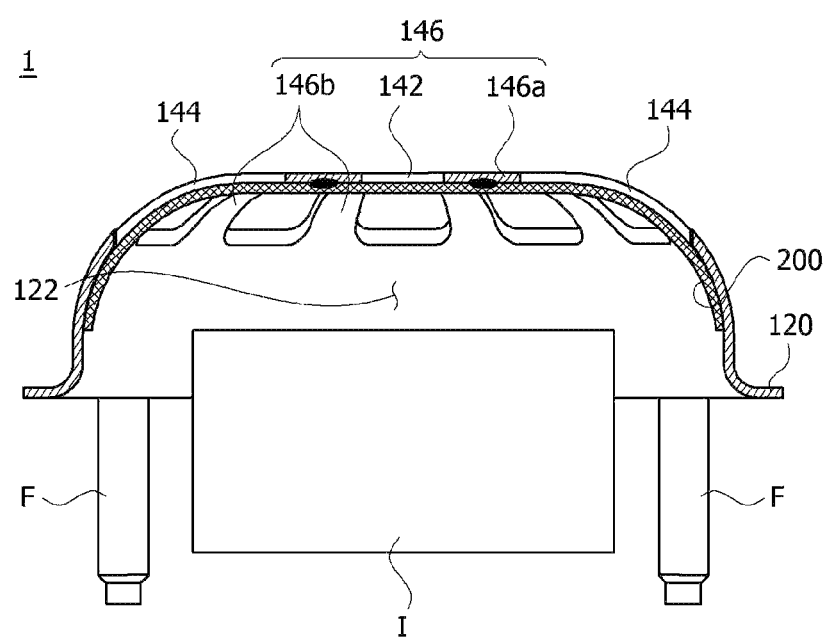
FIG. 2 is a cross-sectional view illustrating the airbag retainer assembly along line A-A of FIG. 1.

FIG. 1 is a perspective view illustrating an airbag retainer assembly according to one embodiment of the present invention, and FIG. 2 is a cross-sectional view illustrating the airbag retainer assembly along line A-A of FIG. 1.

Referring to FIGS. 1 and 2, an airbag retainer assembly 1 according to one embodiment of the present invention includes an airbag retainer 100 which accommodates an inflator I therein and a filter 200 coupled to the airbag retainer 100.

The airbag retainer 100 may be coupled to an airbag cushion (not shown). More specifically, the airbag retainer 100 may be disposed in the airbag cushion. In addition, the airbag retainer 100 may be coupled to a housing (not shown) which accommodates the airbag cushion therein using a plurality of coupling members F.

The airbag retainer 100 may include a base part 120 and a cage part 140.

The base part 120 may be provided in a shape having a quadrangular edge. The plurality of coupling members F may be disposed around corners of the base part 120. The base part 120 may support the cage part 140.

The base part 120 may include an accommodation hole 122. The accommodation hole 122 may be formed to pass through the base part 120. The accommodation hole 122 may have a circular shape but is not limited thereto. For example, the accommodation hole 122 may be modified to have any of a variety of shapes according to a shape of the inflator I. The accommodation hole 122 may be disposed inside the plurality of coupling members F disposed on the base part 120.

The cage part 140 may protrude from an edge of the accommodation hole 122. The cage part 140 may have a dome shape but is not limited thereto. The cage part 140 may partially accommodate the inflator I. The cage part 140 may be provided to have a shape integrated with the base part 120 but is not limited thereto. The cage part 140 may be provided as a separate part from the base part 120 and coupled to the base part 120.

The cage part 140 may include a discharge hole and a supporting part 146.

The discharge hole may be formed in the cage part 140. The discharge hole may include a first discharge hole 142 and a second discharge hole 144. As illustrated in FIGS. 1 and 2, the first discharge hole 142 and the second discharge hole 144 are illustrated as having different shapes but are not limited thereto. The first discharge hole 142 and the second discharge hole 144 may be provided to have the same shape.

The first discharge hole 142 may be disposed in an uppermost end of the cage part 140 based on FIG. 2. The first discharge hole 142 may be provided in a circular shape but is not limited thereto.

A plurality of second discharge holes 144 may be disposed to be spaced apart from each other along a circumference of the accommodation hole 122 of the base part 120. The second discharge holes 144 may be disposed to be spaced apart from the first discharge hole 142. The plurality of second discharge holes 144 may be disposed to surround the first discharge hole 142. The second discharge hole 144 may have a shape extending from the first discharge hole 142 toward a corner of the base part 120. With the first discharge hole 142, the second discharge holes 144 may allow gas discharged from the inflator I to pass therethrough.

The supporting part 146 may be formed due to the first discharge hole 142 and the second discharge holes 144. The supporting part 146 may support the filter 200.

The supporting part 146 may include a first supporting part 146a and a second supporting part 146b.

The first supporting part 146a may be disposed between the first discharge hole 142 and the second discharge holes 144. The first supporting part 146a may be provided in a ring shape but is not limited thereto. A size of the first supporting part 146a may vary according to a separation distance between the first discharge hole 142 and the second discharge hole 144.

The second supporting part 146b may be disposed between the second discharge holes 144. That is, the second supporting part 146b may be a portion remaining after the second discharge holes 144 are formed. Accordingly, a plurality of second supporting parts 146b are disposed. The second supporting parts 146b may be disposed along the circumference of the accommodation hole 122 of the base part 120 like the second discharge holes 144. The second supporting parts 146b may be connected to the first supporting part 146a. Accordingly, the second supporting parts 146b may support the first supporting part 146a. With the first supporting part 146a, the second supporting parts 146b may support the filter 200.

As illustrated in FIG. 2, the filter 200 may be disposed inside the airbag retainer 100. The filter 200 may be coupled to an inner surface of the cage part 140 of the airbag retainer 100. More specifically, the filter 200 may be coupled to the first supporting part 146a and the second supporting parts 146b formed in the cage part 140.

The filter 200 may be partially exposed through the first discharge hole 142 and the second discharge holes 144. Accordingly, gas generated by the inflator I may pass through the filter 200 and move toward the first discharge hole 142 or the second discharge holes 144. The filter 200 may be disposed inside the airbag retainer 100 to block particles discharged with gas from the inflator I from moving to an interior of the airbag cushion.

As illustrated FIG. 2, the filter 200 may be fixed to the cage part 140 of the airbag retainer 100 by a welding operation or the like. More specifically, the filter 200 may be fixed to the first supporting part 146a through spot welding while in contact with an inner surface of the first supporting part 146a of the cage part 140. Accordingly, the number of welding spots for fixing the filter 200 can be reduced compared to the conventional structure in which, due to the retainer having a quadrangular edge, an entire portion not including an edge portion is exposed, which requires many welding operations for fixing. Accordingly, a cost and time for fixing the filter 200 can be reduced.

In addition, the airbag retainer assembly 1 according to one embodiment of the present invention may stably and fixedly support the filter 200. Accordingly, compared to the conventional retainer which does not support a portion not including an edge portion, in the airbag retainer 100 according to one embodiment of the present invention, since separation of the filter from the airbag retainer 100 due to a pressure of gas discharged from the inflator I does not occur, the stability of the filter 200 can be improved, and the performance of the filter 200 can be maintained.

In addition, compared to the conventional structure in which two components are used to fix the filter 200 and also couple the filter 200 to the airbag cushion, in the airbag retainer assembly 1 according to one embodiment of the present invention, since only one component can fix the filter 200 and also couple the filter to the airbag cushion, a cost and time for preparing the two components can be reduced.

Figure 3:
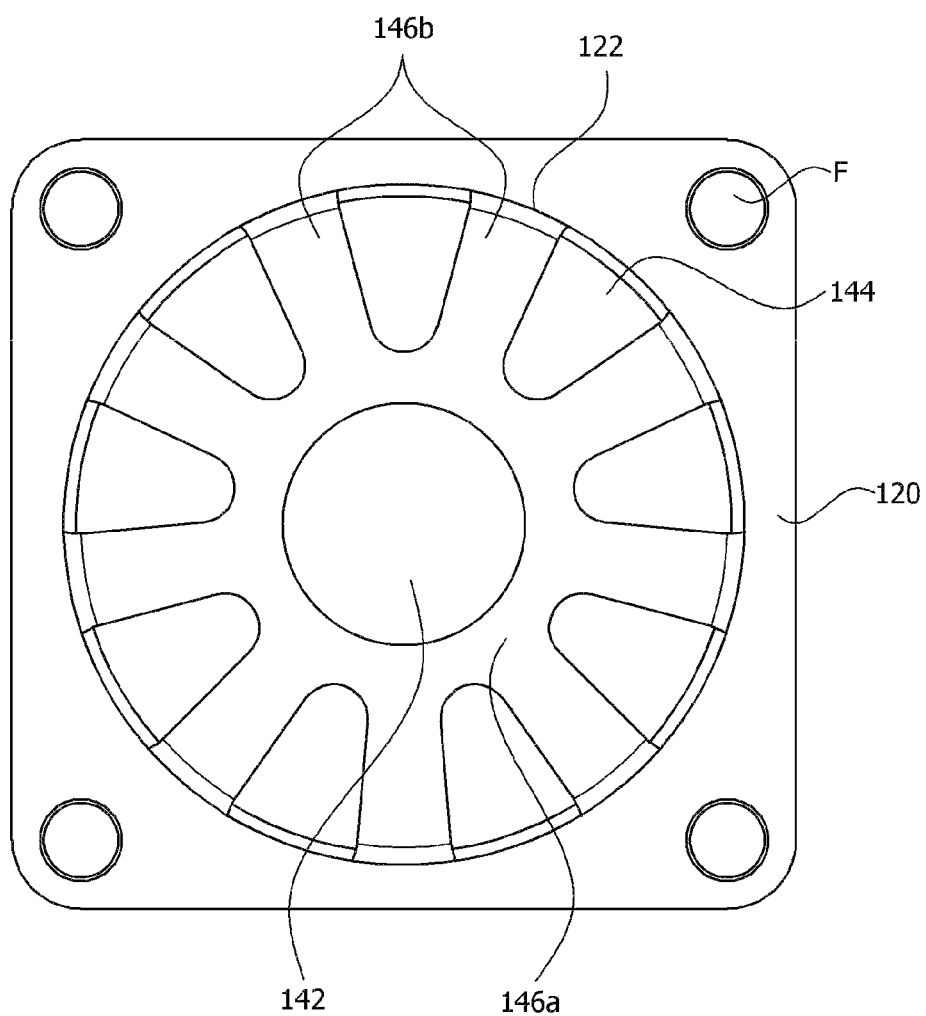
FIGS. 3 and 4 are views illustrating various embodiments of an airbag retainer.
Figure 4:
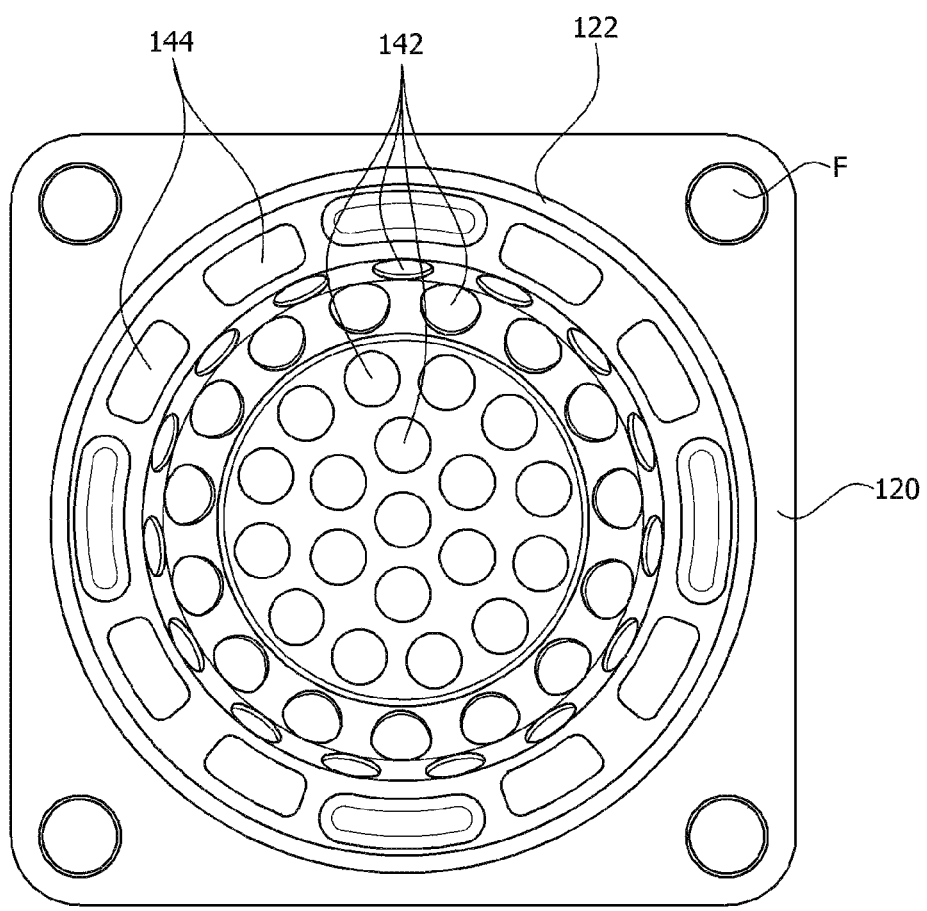

FIGS. 3 and 4 are views illustrating various embodiments of an airbag retainer.

Referring to FIG. 3, a size of a first discharge hole 142 may be greater than a size of the first discharge hole 142 of FIGS. 1 and 2. In addition, an area of a second discharge hole 144 may be greater than an area of the second discharge hole 144 of FIGS. 1 and 2 in a radial direction. Accordingly, an amount of gas passing through the first discharge hole 142 or the second discharge holes 144 may be greater than an amount of gas passing through the first discharge hole 142 or the second discharge holes 144 of FIGS. 1 and 2.

Referring to FIG. 4, a plurality of first discharge holes 142 may be disposed in a cage part 140. The plurality of first discharge holes 142 may be disposed to be spaced apart from each other in a radial direction of an accommodation hole 122.

As described above, an airbag retainer assembly 1 can have any of a variety of gas discharge structures by variously setting a size or layout of the discharge holes.

According to one embodiment, since a structure in which particles discharged from an inflator I are blocked from entering an airbag cushion and separation of a filter to the outside due to a gas pressure is prevented is formed, the stability of the filter is improved, and the performance of the airbag cushion can be maintained.

In addition, according to one embodiment, unlike the structure of the conventional retainer in which a filter is fixed and particles are blocked using two components, since only one component can fix a filter and block particles, a cost and time for preparing a plurality of retainer components can be reduced.

In addition, according to one embodiment, provided is an airbag retainer improved to stably support a filter while minimizing the number of welding spots and an airbag retainer assembly including the same.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An airbag retainer coupled to a filter, the airbag retainer comprising:
   an accommodation hole to accommodate an inflator is formed in a base; and
   a cage extending from an edge of the accommodation hole, the cage being configured to cover the accommodation hole;
   one or more discharge holes disposed in the cage to transmit gas discharged from the inflator; and a support formed in the cage along a circumference of the one or more discharge holes to support the filter,
wherein the support is coupled to the filter such that the filter conforms to an inner surface of the cage, and
wherein the filter is configured to block residue generated by gas discharged from the inflator.

2. The airbag retainer of claim 1, wherein:
the one or more discharge holes comprise a first discharge hole and a second discharge hole disposed to surround the first discharge hole; and
the filter is partially exposed through the first discharge hole and the second discharge hole.

3. The airbag retainer of claim 1, wherein the support is disposed between the first discharge hole and the second discharge hole.

4. The airbag retainer of claim 3, wherein:
the second discharge hole comprises a plurality of second discharge openings spaced apart from each other along a circumference of the accommodation hole; and
a plurality of second supports formed in the cage and each of the plurality of second supports being disposed between two of the plurality of second discharge holes, respectively.

5. An airbag retainer assembly comprising:
an airbag retainer configured to accommodates an inflator; and
a filter coupled to the airbag retainer,
wherein the airbag retainer comprises
accommodation hole to accommodate the inflator is formed in a base,
a cage extending from an edge of the accommodation hole, and the cage being configured to cover the accommodation hole,
a first discharge hole and a plurality of second discharge holes being formed in the cage to transmit gas discharged from the inflator, and
a support formed in the cage between the first discharge hole and the second discharge hole to support the filter, and
wherein the support is coupled to the filter such that the filter conforms to an inner surface of the cage.

6. The airbag retainer assembly of claim 5, wherein the filter is partially exposed through the first discharge hole and the second discharge hole.

7. The airbag retainer assembly of claim 5, wherein the support is disposed between the first discharge hole and the second discharge hole and has a ring shape.

8. The airbag retainer assembly of claim 7, wherein:
the second discharge hole comprises a plurality of second discharge openings spaced apart from each other along a circumference of the accommodation hole; and
a plurality of second supports formed in the cage and each of the plurality of second supports being disposed between two of the plurality of second discharge holes, respectively.

* * * * *